United States Patent [19]

Ramsey

[11] Patent Number: 4,790,428
[45] Date of Patent: Dec. 13, 1988

[54] CONVEYOR BELT GUIDE ROLLERS

[76] Inventor: Dean L. Ramsey, 207 Silverview Dr., Sarver, Pa. 16055

[21] Appl. No.: 12,153

[22] Filed: Feb. 9, 1987

[51] Int. Cl.⁴ ............................................ B65G 15/60
[52] U.S. Cl. ..................................... 198/840; 226/17
[58] Field of Search ........................ 198/840; 414/129; 271/240; 226/15, 17

[56] References Cited

U.S. PATENT DOCUMENTS

| | | | |
|---|---|---|---|
| 977,987 | 12/1910 | Willson, Jr. | 198/840 X |
| 2,239,687 | 4/1941 | Parker | 198/840 X |
| 3,972,414 | 8/1976 | Conrad | 198/840 X |

OTHER PUBLICATIONS

Selected pages from *Installation, Maintenance and Lubrication of Underground Belt Conveyors*, published by ELMAC Corporation of Huntington, W.V.

Primary Examiner—Robert J. Spar
Assistant Examiner—Cheryl L. Gastineau
Attorney, Agent, or Firm—Michael Dever; Buchanan Ingersoll

[57] ABSTRACT

A conveyor belt guide apparatus is provided in which a guide roller is attached on either side of a conveyor belt and contacts the same. The guide roller is designed to rotate by the force of the conveyor belt when the conveyor belt moves off center. Spiral rings are positioned on the guide rollers in such a manner that the rings have a vertical pitch in the direction in which the conveyor belt causes the guide roller to rotate. When the conveyor belt attempts to climb up the guide roller, it engages the spiral rings and is forced back down. In this manner, the conveyor belt is prevented from climbing above the guide rollers and is adjusted back to its normal position.

4 Claims, 1 Drawing Sheet

CONVEYOR BELT GUIDE ROLLERS

BACKGROUND OF THE INVENTION

1. Field of the Invention

This invention relates generally to the field of conveyor belts, and more particularly concerns guide rollers which minimize misalignment of the conveyor belt and keep it in perspective.

2. Description of the Prior Art

Guide rollers for conveyor belts are cylindrical rollers which are used on either top or return center pivoted belt structure assemblies to limit the lateral movement of a conveyor belt. Generally, the rollers are aligned in pairs with one roller on either side of the conveyor belt. When a conveyor belt begins to move off center, it will contact the guide roller which will jolt the belt back into alignment. However, it is possible for the conveyor belt to climb up and over the guide roller, causing spillage of the contents and damage to the belt. This will cause the conveyor belt to move out of alignment. To realign the belt, it is necessary to stop the conveyor and readjust the belt within the guide rollers. Accordingly, there is a need for a guide roller which prevents the conveyor belt from climbing over the guide roller and moving out of alignment.

SUMMARY OF THE INVENTION

In accordance with the invention, a guide apparatus for a conveyor belt is provided which prevents the conveyor belt from climbing over the guide roller. A spiral ring is provided along the outside of a guide roller located at a side of a center pivoted belt structure assembly. The spiral ring is designed such that upon rotation the ring descends the guide roller. The guide roller is rotatably supported adjacent the side of the belt. Each guide roller is generally paired up with a mirror image of itself on the other side of the conveyor belt, however, the guide rollers can be spaced apart or used in unison.

As the conveyor belt contacts the guide roller, it rotates the guide roller. When the conveyor belt moves off center, it will begin to climb up one of the guide rollers. As it does so, the conveyor belt comes in contact with the spiral ring. The spiral ring rotates down the guide roller, forcing the conveyor belt back down with it. In this manner, the guide roller adjusts the center pivoted structure assembly and realigns the conveyor belt when the belt begins to move off course.

DESCRIPTION OF THE PREFERRED EMBODIMENT

Figure 1:
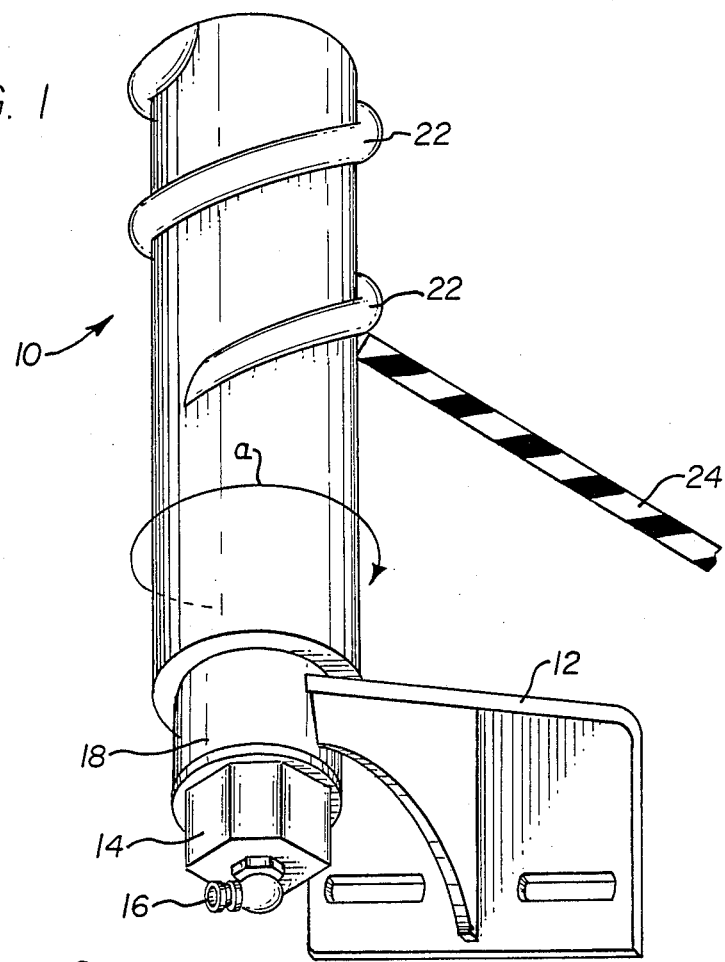
FIG. 1 is an isometric view of a guide roller of this invention.
Figure 2:
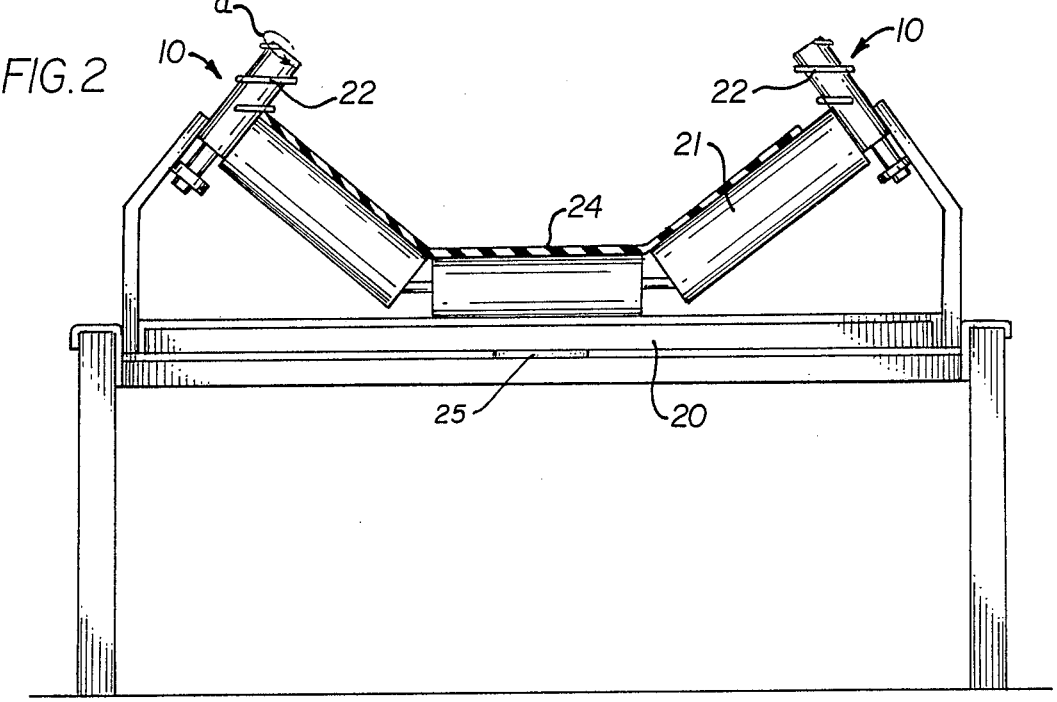
FIG. 2 shows a pair of the guide rollers of this invention in operation as they engage the conveyor belt.

As shown in FIG. 1, guide roller 10 is rotatably connected to bearing sleeve 18 by means of screw 14 and grease fitting 16. Bearing sleeve 18 is connected to bracket mount 12 which, as shown in FIG. 2, attaches guide roller 10 to a center pivoted structure 20 which sits underneath the conveyor belt 24. Conveyor belt 24 pivots about center pivoted structure 20 by means of center pivot 25. The guide roller 10 is supported by center pivoted structure 20 and is adjacent to the side of conveyor belt 24. A spiral ring 22 is provided along the outer portion of guide roller 10. The ring 22 begins about midway up the guide roller 10 and continues upward to the top.

The direction which spiral ring 22 wraps around guide roller 10 depends on which side of the conveyor belt the guide roller will be placed. The spiral ring 22 is arranged such that it has a vertical pitch identical to the direction in which the conveyor belt 24 causes the guide roller 10 to rotate. The specific guide roller 10 shown in FIG. 1 is designed to be used with the conveyor belt 24 to its right and the belt is heading into the paper. The rotation of guide roller 10 is indicated by arrow a.

As shown in FIG. 2, again with belt 24 heading into the paper, mirror image guide rollers 10 are placed on either side of the conveyor belt 24. Guide rollers 10, which do not bear any of the load carried by belt 24 are attached to center pivoted structure 20 in such a manner that a section of conveyor belt 24 will pass guide rollers 10 before it encounters the load bearing idlers 21 of center pivoted structure 20. However, the guide rollers 10 can also be effectively arranged in a spaced apart arrangement or can be used in unison. When the conveyor belt 24 moves off center, it will engage one of the guide rollers 10. The guide roller 10 will rotate, propelled by the force of conveyor belt 24. If conveyor belt 24 attempts to climb up guide roller 10, it will engage spiral ring 22. Spiral ring 22, because of the rotation of guide roller 10, indicated by arrows a, will exert a downward force on the conveyor belt 24. In such a manner, the conveyor belt 24 is prevented from climbing over the top of guide roller 10. Eventually, guide roller 10 will jolt conveyor belt 24 back into alignment.

Because of the action of spiral ring 22 on conveyor belt 24, it is necessary that the angle between the guide roller 10 and conveyor belt 24 be limited. Accordingly, guide roller 10 must be at an angle at least less than 180 degrees from the conveyor belt. Preferably, the angle is around 90 degrees.

While I have shown and described a present preferred embodiment of the invention and have illustrated a present preferred method for practicing the same, it is to be distinctly understood that the invention is not limited thereto but may be otherwise variously embodied and practiced within the scope of the following claims.

I claim:

1. A guide apparatus for repositioning a misaligned conveyor belt and restricting lateral movement of said belt comprising:

(a) a load-bearing idler roller located underneath said conveyor belt and mounted on a center pivoted structure assembly, said load-bearing idler roller having a generally smooth surface; and (b) a first non-load bearing guide roller mounted on said center pivoted structure assembly and positioned along a side of said conveyor belt and aligned generally perpendicular to said belt for restraining lateral movement of said belt, said first guide roller mounted on said center pivoted structure assembly in such a manner that said first guide roller is longitudinally offset from said assembly in an upstream direction relative to the movement of said conveyor belt such that a section of the belt will contact the first guide roller ahead of the load-bearing idler roller, said first guide roller having a spiral ring encircled about it to guide the belt and force it downwardly along the first guide roller when an upper lateral edge of the belt contacts the spiral ring thereby preventing said belt from climbing above said first guide roller.

2. Apparatus in claim 1 further comprising:

a second non-load bearing guide roller mounted on said center pivoted structure assembly and positioned along a side of said conveyor belt opposite said first guide roller and aligned generally perpendicular to said belt for restraining lateral movement of said belt, said second guide roller mounted on said center pivoted structure assembly in such a manner that said second guide roller is longitudinally offset from said assembly in an upstream direction relative to the movement of said conveyor belt such that a section of the belt will contact the second guide roller ahead of the load-bearing idler roller, said second guide roller having a spiral ring encircled about it to guide the belt and force it downwardly along the second guide roller when an upper lateral edge of the belt contacts the spiral ring thereby preventing said belt from climbing above said second guide roller.

3. Apparatus according to claim 2 wherein the spiral ring of the first guide roller and the spiral ring of the second guide roller have a vertical pitch in the same direction in which each of said guide rollers is rotated by said belt.

4. Apparatus in claim 3 in which the spiral ring of the first guide roller commences at a point approximately midway up the first guide roller and continues vertically up the first guide roller until it engages the top of the first guide roller and the spiral ring of the second guide roller commences at a point approximately midway up the second guide roller and continues vertically up the second guide roller until it engages the top of the second guide roller.

* * * * *